Sept. 18, 1923.

H. GREEN ET AL 1,468,469

TRUCK

Filed April 10, 1922      2 Sheets-Sheet 2

Patented Sept. 18, 1923.

1,468,469

UNITED STATES PATENT OFFICE.

HAROLD GREEN, OF YONKERS, NEW YORK, AND WARREN M. LYMAN, OF JERSEY CITY, NEW JERSEY, ASSIGNORS TO REVOLVATOR COMPANY, OF JERSEY CITY, NEW JERSEY, A CORPORATION OF NEW JERSEY.

TRUCK.

Application filed April 10, 1922. Serial No. 551,329.

*To all whom it may concern:*

Be it known that we, HAROLD GREEN, residing at Yonkers, in the county of Westchester and State of New York, and WARREN M. LYMAN, residing at Jersey City, in the county of Hudson and State of New Jersey, citizens of the United States of America, have invented certain new and useful Improvements in Trucks, of which the following is a specification, reference being had to the accompanying drawings.

This invention relates to improvements in trucks, and particularly to improvements in trucks of the lifting-platform type. An object of this invention is to provide a lifting-platform truck with means for preventing the inadvertent lowering of the platform of the truck, thereby safeguarding the operator from the danger of injury, to which he is exposed in the event of the accidental lowering of the platform in trucks as they have heretofore been designed. Another feature of this invention resides in the provision of a latch-tripping pedal operable from either side of the tongue of the truck, instead of from only one side, as is the case in trucks heretofore in use.

Figure 1:
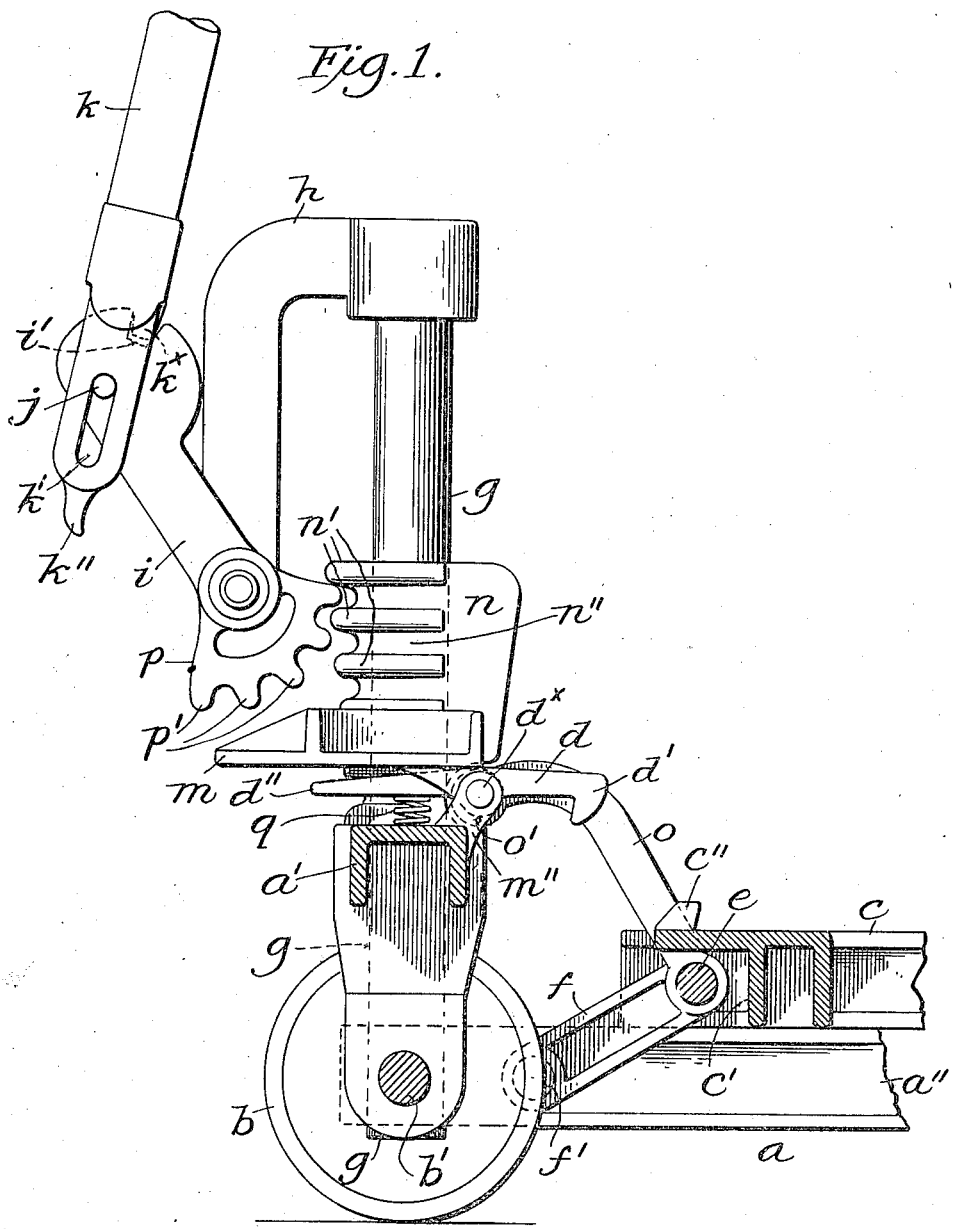
Figure 2:
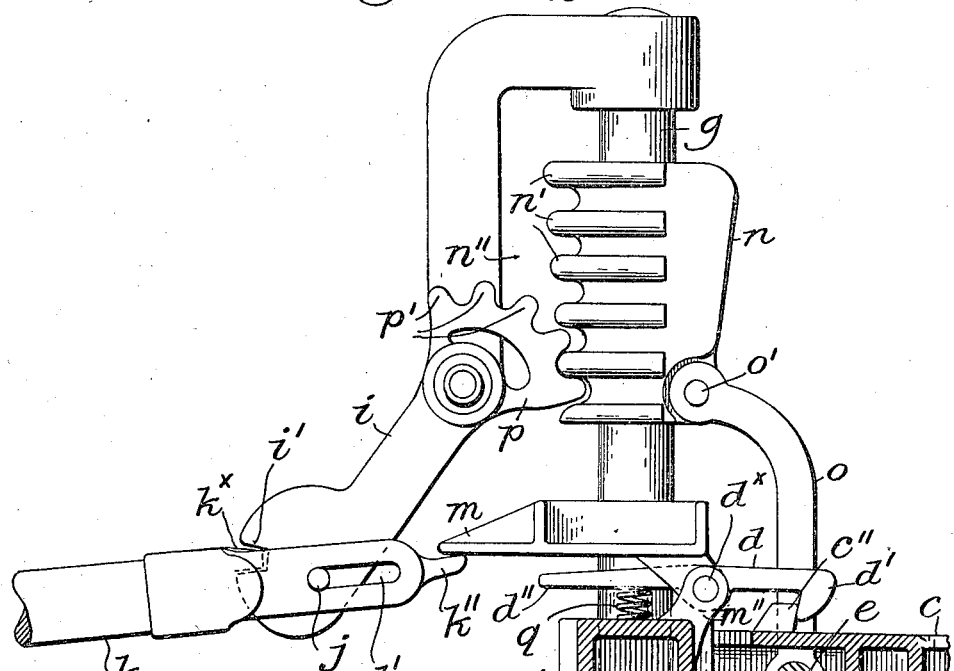

In the drawings illustrating the principle of this invention and the best mode now known to us of applying that principle, Fig. 1 is an elevation, partly in section, of so much of the platform elevating and lowering mechanism as may be necessary to illustrate this invention, the platform being shown in its lowered position; Fig. 2 illustrates the same mechanism, in a like view, the platform being shown in its raised position; and Fig. 3 is a detail, illustrating, in plan, the latch-releasing pedal and the parts thereby controlled.

The truck-frame, a fragment of which is shown at $a$, is supported upon wheels, one of which (the caster-wheel) is shown, marked $b$. Overlying the frame $a$, there is provided a lifting-platform $c$ formed, at one side of its front transverse face $c'$, with a fixed tooth or dog $c''$ that is arranged to be engaged with the tooth end $d'$ of a pivoted dog or latch $d$, when the platform $c$ is raised (Fig. 2). Extending transversely of the front face $c'$ of the latter, there is mounted a fixed shaft $e$, each end of which forms a pivot for the upper end of a link-arm $f$, the other end of which is mounted rotatably on a pivot $f'$ carried by the truck-frame (or base) $a$. The axle $b'$ upon which is mounted the caster-wheel $b$ is carried by the lower end of a long king-bolt $g$ that is free to turn in a bearing $g'$ (Fig. 3) formed in the frame-head $a'$. To the upper end of the king-bolt $g$, there is fastened securely the upper end of a drop hanger-arm $h$ in the lower end of which there is fulcrumed a lift-lever $i$, to the front end of which there is connected, by a pin $j$, one end of the handle-bar or tongue $k'$. This end of the handle-bar $k$ is formed with a slot $k'$, through which the pin $j$ passes, and, furthermore, with a projection $k''$ that serves as a safety detent or locking-lug for the latch-tripping pedal $m$, when the handle-bar $k$ is thrown into its lowered position shown in Fig. 2. The pedal $m$ is formed with a pair of ears $m^x$ (Fig. 3) and is hingedly fastened by stationary or fixed pins $d^x$ (Figs. 1 and 2), so that it is free to rock between the lugs or ears $m''$ that project from the head $a'$ of the truck-frame $a$, the fixed pivot-pins or hinge-pins $d^x$ passing through holes in the ears $m''$, $m^x$. The dog $d$ is mounted, free to rock, upon one of the fixed hinge-pins $d^x$ (Fig. 3); and this dog $d$ is not secured to the pedal $m$ but is free from attachment thereto, although its end $d''$ is actuated thereby, when the dog $d$ is tripped and the platform $c$ is released by depressing the pedal $m$.

Slidably mounted on the upper portion of the king-bolt $g$, there is a lifting-block $n$ (known as a "spool"), to the back of the lower end of which there is hingedly fastened at $o'$ the upper end of a lift-arm $o$ through the lower end of which passes the shaft $e$ (Fig. 3), whereby the slidable spool $n$ and the lifting-platform $c$ are linked together. The front face of the spool $n$ is formed with a vertical series of horizontally-disposed teeth $n'$ that are segmental (or practically semi-circular) in form and that diminish gradually in diameter from the uppermost to the lowermost tooth, so that these teeth $n'$ may be said to lie in the surface of an inverted cone, or to form a conical rack $n''$. With the teeth $n'$ of this rack $n''$, there engage the teeth $p'$ of a vertically-disposed segment $p$ formed on the inner end of the lift-lever $i$. The outer or front end of this lift-lever $i$ is formed with a notch or recess $i'$ with the walls of which engages a tooth or lug $k^x$ formed on the handle-bar $k$. The slip-joint or pin-and-slot connection formed by the pin $j$ and the slot $k'$ permits the engagement and disengagement of the tooth $k^x$ with and from the walls of the recess $i'$, by merely thrusting the handle-bar $k$ towards the lift-lever $i$, or pulling that handle away therefrom. The lifting-platform $c$ being in its lowered position and resting on the side-bars $a''$ of the frame $a$, and the handle-bar $k$ being in the raised position illustrated in Fig. 1 and its lower end being interlocked with the outer end of the lift-lever $i$ by the insertion of the tooth $k^x$ in the recess $i'$, the uppermost tooth or cog $p'$ of the toothed segment $p$ is in mesh with the topmost tooth of the rack $n''$ formed on the lifting slide-block or spool $n$. By now pulling the handle-bar $k$ outwardly and downwardly, the toothed segmental end $p$ of the lift-lever $i$ is thrown upwardly, so that the spool or slide-block $n$ is caused to slide or travel upwardly along the king-bolt $g$, whereby the lifting-platform $c$ is, by virtue of its link connection with the spool $n$ through the lift-arm $o$, made to swing on the link-arms $f$ upwardly and away from the truck-base $a$. When the handle-bar $k$ has been thrown into the lowered or horizontal position shown in Fig. 2, the spool $n$ has reached the upper limit of its travel and the lifting-platform $c$ has attained its raised position, in which its fixed tooth $c''$ passes under and into engagement with the toothed end $d'$ of the pawl or pivoted latch $d$ and is held securely, the coil-spring $q$ throwing up the tail-end $d''$ of the latch or clutch $d$ and retaining the dog $c''$ and clutch $d$ in interlocking position and the platform $c$ in raised position. When the handle-bar $k$ is thrown into its lowered, horizontal position (Fig. 2), the safety lug or detent $k''$ on its inner end engages the lower face of the tripping-pedal $m$, thereby locking that pedal against operation; and, in this position of the handle-bar $k$, the lifting-platform $c$ is raised. A coil-spring $m'$ tends to hold the body-part of the tripping latch $m$ in raised position. Were there provided no such means for locking the pedal $m$ from being rocked so as to release the latch or pawl $d$ and thereby to permit the platform $c$ to be lowered into the position shown in Fig. 1, such downward movement of the platform $c$ and its connected parts (the lift-arm $o$, the spool $n$ and the toothed end of the lift-lever $i$) would result in the upward throw of the outer end of the lift-lever $i$; and, if the workman should have inadvertantly left the handle-bar $k$ and the lift-lever $i$ interlocked with each other through the medium of the tooth or lug $k^x$ being thrust into the recess $i'$, the handle-bar $k$ would be thrown upwardly with the outer end of the lift-lever $i$, and the workman would be in danger of being struck and injured by the handle-bar $k$, as it followed the upward throw of the outer part of the lift-lever $i$. But the provision of the locking lug or detent $k''$ renders it impossible to depress the pedal $m$ and thereby to permit the lowering away of the platform $c$, while the handle-bar $k$ is coupled with the outer end of the lift-lever $i$, through the medium of the engagement of the tooth $k^x$ with the walls of the recess $i'$. The workman must first disengage the handle-bar $k$ from the lift-lever $i$, by pulling the lug $k^x$ out of the recess $i'$, and so withdraw the detent $k''$ from its pedal-locking position below the pedal $m$, before he can depress the same so to release the clutch or latch $d$ from its engagement with the fixed dog or tooth $c''$ so as to permit the lifting-platform $c$ to descend into its lowered position shown in Fig. 1.

Figure 3:
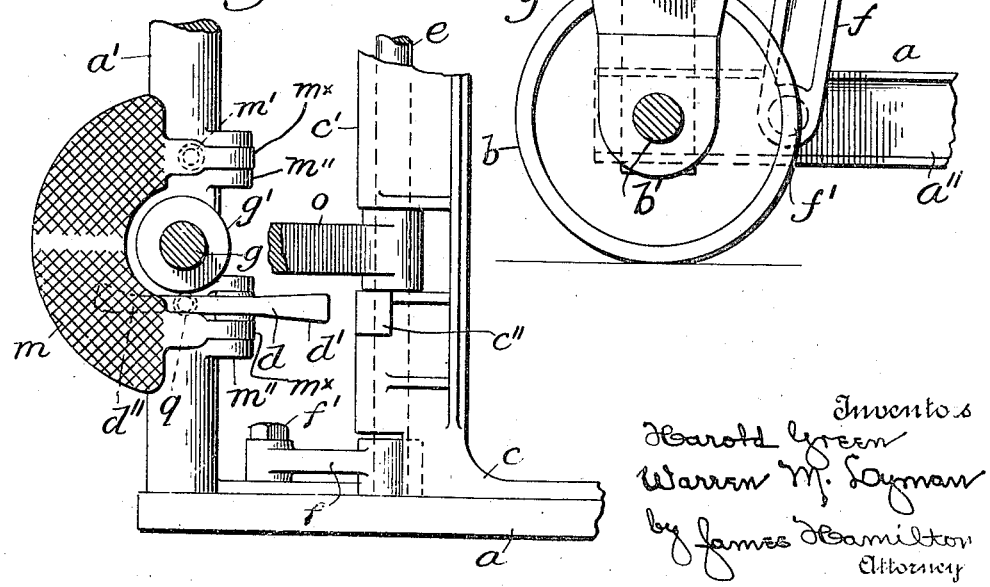

As is plainly illustrated in Fig. 3, the pedal $m$ is semi-circlar in shape and is hingedly mounted in ears $m''$ formed on the head $a'$ of the truck frame $a'$. By giving to the pedal $m$ its semi-circular form, the operator is enabled to depress the pedal from either side of the tongue or handle-bar $k$.

In accordance with the patent statutes, we have shown and described the preferred form of this invention. We desire it to be distinctly understood that we fully realize that changes may be made in the structure herein disclosed and that we intend to include within the scope of the claims that follow hereinafter all modifications of the preferred form of this invention that do not depart substantially from the spirit thereof. For example, the caster-wheel $b$ may be either a single caster-wheel or a double caster-wheel. Again, the semi-circular tripping pedal $m$ may be made integral with the tail-end of the latch $d$, in which case the safety detent $k''$ may be omitted.

We claim:

1. An apparatus of the character described, including a base; a load-carrying platform capable of being raised with respect to the base of the apparatus; retaining means for holding the platform in its raised position; releasing means controlling the retaining means and actuating the same to permit the platform to descend towards the base; and mechanism for locking the releasing means automatically at the end of the upward movement of the platform, whereby the inadvertent operation of the releasing means is prevented.

2. An apparatus of the character described, including a base; a load-carrying platform capable of being raised with respect to the base of the apparatus; elevating mechanism for raising the patform above the base; retaining means for holding the platform in its raised position; releasing means controlling the retaining means and arranged for actuation of the same to permit the platform to descend towards the base; and a locking device controlled by the elevating mechanism for rendering the releasing means incapable of inadvertent operation while the platform is in its raised position.

3. An apparatus according to claim 2, characterized in that the releasing means is operable by the workman from either side of the elevating mechanism.

4. An apparatus of the character described, including a base; a load-carrying platform capable of being raised with respect to the base of the apparatus; elevating means for raising the platform above the base; retaining means for holding the platform in its raised position; releasing means controlling the retaining means and arranged for actuation of the same to permit the platform to descend towards the base; operating mechanism controlling the elevating means and capable of being detachably interlocked therewith; and a locking device controlled by the operating mechanism for the elevating means and arranged to render automatically the releasing means incapable of inadvertent actuation while the platform is in its raised position, and the operating mechanism is interlocked with the elevating means.

Signed at Jersey City, in the county of Hudson and State of New Jersey, this eighth day of April, 1922, in the presence of the undersigned witness.

HAROLD GREEN.
WARREN M. LYMAN.
Signed in the presence of—
  HENRY G. HERMANN.